United States Patent
Yamada et al.

(10) Patent No.: US 10,145,998 B2
(45) Date of Patent: Dec. 4, 2018

(54) LIQUID CRYSTAL DISPLAY DEVICE

(71) Applicant: FUJIFILM Corporation, Tokyo (JP)

(72) Inventors: Naoyoshi Yamada, Kanagawa (JP); Shinichi Nakai, Kanagawa (JP); Maki Mifune, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 14/709,910

(22) Filed: May 12, 2015

(65) Prior Publication Data

US 2015/0331282 A1    Nov. 19, 2015

(30) Foreign Application Priority Data

May 13, 2014    (JP) ................................ 2014-099880

(51) Int. Cl.
  *G02B 5/30*    (2006.01)
  *G02F 1/1335*    (2006.01)
  *G02F 1/13363*    (2006.01)

(52) U.S. Cl.
  CPC ....... *G02B 5/3033* (2013.01); *G02F 1/13363* (2013.01); *G02F 1/133528* (2013.01);
  (Continued)

(58) Field of Classification Search
  CPC ............................ G02B 5/3033; G02B 6/0056; G02B 6/02109; G02B 5/3016; G02B 6/0011;
  (Continued)

(56) References Cited

U.S. PATENT DOCUMENTS

2005/0012883 A1*  1/2005  Umeda ............. G02F 1/133634
                                                    349/117
2012/0229459 A1*  9/2012  Ishiguro ................ G02B 1/105
                                                    345/419
(Continued)

FOREIGN PATENT DOCUMENTS

JP            4962661 B2    6/2012
JP         2012-137723 A    7/2012
(Continued)

OTHER PUBLICATIONS

Notification of Reasons for Refusal issued by the Japanese Patent Office dated Dec. 27, 2016, in connection with corresponding Japanese Patent Application No. 2014-099880.
(Continued)

*Primary Examiner* — Edward Glick
*Assistant Examiner* — Shan Liu
(74) *Attorney, Agent, or Firm* — Edwards Neils LLC; Jean C. Edwards, Esq.

(57)    ABSTRACT

A liquid crystal display device has a light source unit and a liquid crystal cell sandwiched by two polarizing plates. The light emitted by the light source unit has separated peaks in each of blue, green and red wavelength ranges. The green and red peaks have a full width at half maximum intensity of 20 nm or more. At least one of the polarizing plates has a polarizer and a protective film with a Re of 5,000 nm or more and low moisture permeability. The device exhibits excellent color reproducibility and prevents display nonuniformity under a high temperature and high humidity environment.

10 Claims, 3 Drawing Sheets

(52) U.S. Cl.
CPC ............. *G02F 1/133603* (2013.01); *G02F 2001/133614* (2013.01); *G02F 2201/50* (2013.01)

(58) Field of Classification Search
CPC .. G02B 6/0013; G02B 6/0015; G02B 6/0016; G02B 6/0018; G02B 6/002; G02B 6/0021; G02B 6/0023; G02B 6/0025; G02B 6/0026; G02B 6/0028; G02B 6/003; G02B 6/0031; G02F 1/133603; G02F 1/13363; G02F 1/133528; G02F 2001/133614; G02F 2201/50; G02F 1/0311; G02F 1/116; G02F 1/1335; G02F 1/133536; G02F 1/13362; G02F 1/133533; G02F 2001/133531; G02F 2001/133521; G02F 2001/133356; G02F 2001/133538; G02F 2001/133541; G02F 2001/133543; G02F 2001/133545; G02F 2001/133548; G02F 2001/13355; G02F 2001/133562; G02F 2001/133567; G02F 2203/16; G02F 1/1347; G02F 1/13471; G02F 1/1336; G02F 2001/133607; G02F 2001/133616; G02F 1/133606; G02F 1/133504; G02F 1/133615; G02F 1/133617; B29D 11/00644; B32B 17/10458; B32B 2307/42; H01L 51/5293; H01R 12/7005; H04B 10/532; G01J 5/0825; G03F 9/7065; G01R 33/3678; C09K 19/0208
USPC ............................... 349/96–103, 194, 61–71
See application file for complete search history.

(56) References Cited

U.S. PATENT DOCUMENTS

| | | | |
|---|---|---|---|
| 2012/0250142 A1* | 10/2012 | Kobuchi | G02F 1/00 359/321 |
| 2013/0021560 A1* | 1/2013 | Wang | G02F 1/133603 349/69 |
| 2013/0100378 A1* | 4/2013 | Murata | G02F 1/133528 349/61 |
| 2013/0194211 A1* | 8/2013 | Shinohara | G02B 1/115 345/173 |
| 2014/0098325 A1* | 4/2014 | Murata | G02F 1/133528 349/69 |
| 2014/0104519 A1* | 4/2014 | Murata | G02B 5/3033 349/69 |
| 2014/0168770 A1* | 6/2014 | Wang | B32B 23/20 359/489.07 |

FOREIGN PATENT DOCUMENTS

| | | |
|---|---|---|
| JP | 2012-256014 A | 12/2012 |
| WO | 2014/021242 A1 | 2/2014 |

OTHER PUBLICATIONS

Jason Heart Love; Quantum dot technology of LED backlight, LCD realizes wide color gamut; LEDs Magazine. Japan, Dec. 2011; pp. 14-16; Japan; URL: http://ex-press.jp/wp-content/uploads/2011/12/fc89be0bfe0315994be403fda0c80934.pdf.

* cited by examiner

LIQUID CRYSTAL DISPLAY DEVICE

CROSS-REFERENCE TO RELATED APPLICATIONS

This application claims priority under 35 U.S.C 119 to Japanese Patent Application No. 2014-99880 filed on May 13, 2014. The above application is hereby expressly incorporated by reference, in its entirety, into the present application.

BACKGROUND OF THE INVENTION

Field of the Invention

The present invention relates to a liquid crystal display device. The present invention relates to a liquid crystal display device having a light source unit, a liquid crystal cell, a polarizer and a protective film in detail.

Description of the Related Art

Recently, use of Liquid Crystal Display, LCD, is enlarged and it is used for a TV, a monitor, a smart phone, a car navigation system, a digital camera, a digital signage and etc.

A liquid crystal display device generally has polarizing plates on both a liquid crystal cell's viewing-side and a light source unit-side. A polarizing plate used for a liquid crystal display device generally has a configuration formed by bonding a transparent protective film on both sides of a polarizer which is composed of polyvinyl alcohol-based film or the like adsorbed and oriented with iodine or a dichroic dye. For the protective film, generally a protective film of a cellulose acylate-base typified by cellulose acetate has been widely used since it has high transparency and can easily be ensured adhesion between the polyvinyl alcohol film used in the polarizer.

Recently, as expanding applications of a liquid crystal display device, a large-size and high-quality texture is needed for a liquid crystal display device. To reduce the mass of the large-sized liquid crystal display device, the thickness of the glass substrates are becoming thinner from traditional 0.7 mm to 0.5 mm or less. Along with it, after the liquid crystal display device is preserved under a high-temperature and high-humidity environment and then light, the liquid crystal display device, there are problem cases of occurring a bending in the liquid crystal cell and further occurring a display nonuniformity (See JP-A-2012-137723).

In JP-A-2012-137723, it is described that using a film having low moisture permeability such as polyethylene terephthalate film makes it possible to be prevented from occurring from bending of the liquid crystal cell where it has been preserved under a high temperature and high humidity environment and then is lighted and to be prevented from occurring a display nonuniformity.

On the other hand, in case where using a polyester film having a larger birefringence than the cellulose acylate-base film as a protective film, it is known that a rainbow-like color unevenness (rainbow-like unevenness) occurs and it is a problem that impairs visibility (See JP-B-4962661 and JP-A-2012-256014).

To solve this problem, JP-B-4962661 and JP-A-2012-256014 disclose a liquid crystal display device having a light source unit which emission intensity spectrum is sequentially such as a white color light-emitting diode (white color LED) and in-plane direction retardation (hereinafter referred to Re) is sufficiently large value. The white color light-emitting diode in JP-B-4962661 and JP-A-2012-256014 is a phosphor type element, that is, an element which emits white color light by combining a light emitting diode emitting blue light or ultraviolet rays by using a compound semiconductor and a phosphor. By such a configuration, even light emitted from the liquid crystal display device is different transmittance for each wavelength, various wavelengths light of red color, green color and blue color constituting the light having a continuous emission intensity spectrum emitted from white color LED is transmitted through the protective film. Therefore, light passing through the protective film is observed white as a whole and so the rainbow-like unevenness is not visually recognized. In addition, in the case where the liquid crystal display device having a protective film having large Re is observed from an oblique direction rather than from the front direction, there is a case where apparent retardation Re of the protective film become a small value as compared to when observing the liquid crystal display device from the front direction and so the rainbow-like unevenness is visually recognized. In JP-B-4962661 and JP-A-2012-256014, an effective range of a thickness direction retardation (hereinafter referred to Rth) is determined for the protective film keeping an apparent large Re in case where the liquid crystal display device is observed from an oblique direction.

SUMMARY OF THE INVENTION

However, liquid crystal display devices disclosed in JP-B-4962661 and JP-A-2012-256014 have a problem which a color reproducibility is low because they used a white color LED as a light source unit which emission intensity spectrum is sequentially.

As mentioned above, so far, a liquid crystal display device exhibiting a high color reproducibility for improving visibility quality of the liquid crystal display device, prevented from occurring a display nonuniformity after preserved under a high-temperature and high-humidity environment and then light, and prevented from occurring a rainbow-like unevenness has not been known.

The problem to be solved by the present invention is to provide a liquid crystal display device exhibiting a high color reproducibility, prevented from occurring a display nonuniformity after preserved under a high-temperature and high-humidity environment and then light, and prevented from occurring a rainbow-like unevenness.

In JP-B-4962661 and JP-A-2012-256014, in the case where a film having low moisture permeability and high Re such as polyethylene terephthalate film is used as a protective film, it is described that to use a light source unit which emission intensity spectrum (that means that there is no wavelength where the emission intensity is zero in at least visible light range) is sequentially such as a white color LED is necessary for preventing from occurring a rainbow-like unevenness. Further, in JP-B-4962661 and JP-A-2012-256014, it is described that a method including the combined use of red-emitting, green-emitting, and blue-emitting LEDs as a white light source unit (it is referred to a method of three color LED, tri color LED, three color independent LED, or RGB (R is an abbreviation of red, G is an abbreviation of green and B is an abbreviation of blue) independently controlled LED) has also been put to practical use. In JP-B-4962661 and JP-A-2012-256014, it is described that this method, however, is not preferred, because it provides a narrow and discontinuous emission intensity spectrum, and therefore, it is expected to become difficult to obtain a desired effect of the invention (that is an effect of preventing from occurring a rainbow-like unevenness).

On the contrary to the description in JP-B-4962661 and JP-A-2012-256014, as a result of a keen examination of the inventors of the present invention to solve the above problem, it was found that the rainbow-like unevenness was not occurred by adjusting the phase difference (retardation) of the protective film to an appropriate range in case where a light source unit which the emission intensity spectrum is improved in the point that the emission intensity at the local maximum is enhanced against that at local minimum in a specific wavelength range is used without using a generally known white color LED. Furthermore, it was found that a liquid crystal display device exhibiting a high color reproducibility and prevented from occurring a display nonuniformity after preserved under a high-temperature and high-humidity environment and then light can be provided by using a film having low moisture permeability as a protective film and controlling the emission intensity spectrum of a light source unit.

The above-mentioned subject is solved by the present invention and the present invention has following components.

[1] A liquid crystal display device having
at least a light source unit emitting light having a blue light emission intensity peak in the wavelength range of 400 to 500 nm, a green light emission intensity peak in the wavelength range of 500 to 600 nm and a red light emission intensity peak in the wavelength range of 600 to 680 nm,
a light source unit-side polarizing plate,
a liquid crystal cell and
a viewing-side polarizing plate in this order,
wherein the full width at half maximum of the green color emission intensity peak and the red color emission intensity peak are 20 nm or more,
wherein the light emitted by the light source unit has a local minimum L1 in the wavelength range of 460 to 520 nm, a local maximum L2 in the wavelength range of 520 to 560 nm and a local minimum L3 in the wavelength range of 560 to 620 nm,
wherein the local minimum L1 and the local minimum L3 are less than 35% of the local maximum L2,
wherein at least one of the light source unit-side polarizing plate and the viewing-side polarizing plate has a polarizer and a first protective film disposed on the surface far from the liquid crystal cell of the polarizer,
wherein an in-plane direction retardation at the wavelength of 589 nm Re(589) of the first protective film is 5,000 nm or more,
wherein the moisture permeability of the first protective film at the temperature of 40° C. and the relative humidity of 90% is 100 g/m$^2$/day or less.

[2] The liquid crystal display device of [1] is preferably a liquid crystal display device,
wherein a ratio of the in-plane direction retardation at the wavelength of 589 nm. Re(589) and a thickness direction retardation at the wavelength of 589 nm Rth(589) Re(589)/Rth(589) in the first protective film is 0.8 to 2.0.

[3] The liquid crystal display device of [1] or [2] is preferably a liquid crystal display device,
wherein the light source unit has
a blue color light emitting diode or an ultraviolet light emitting diode, and
a fluorescent substance,
wherein the fluorescent substance is able to emit light by being excited by light from the blue color light emitting diode or an ultraviolet light emitting diode.

[4] The liquid crystal display device of [3] is preferably a liquid crystal display device,
wherein the fluorescent substance includes at least one quantum dot.

[5] The liquid crystal display device of any one of [1] to [4] is preferably a liquid crystal display device,
wherein the first protective film is stretched at least in uniaxial direction.

[6] The liquid crystal display device of any one of [1] to [5] is preferably a liquid crystal display device,
wherein the first protective film is a polyethylene terephthalate film or a polyethylene-2,6-naphthalate film.

[7] The liquid crystal display device of any one of [1] to [6] is preferably a liquid crystal display device,
wherein the first protective film is a polyethylene terephthalate film.

[8] The liquid crystal display device of any one of [1] to [7] is preferably a liquid crystal display device,
wherein the thickness of the first protective film is 10 to 500 μm.

[9] The liquid crystal display device of any one of [1] to [8] is preferably a liquid crystal display device,
wherein the local minimum L1 and the local minimum L3 are less than 20% of the local maximum L2.

[10] The liquid crystal display device of any one of [1] to [9] is preferably a liquid crystal display device,
wherein the local minimum L1 is both local minimum and minimum L1' in the wavelength range of 460 to 520 nm,
wherein the local maximum L2 is both local maximum and maximum L2' in the wavelength range of 520 to 560 nm,
wherein the local minimum L3 is both local minimum and minimum L3' in the wavelength range of 560 to 620 nm.

[11] The liquid crystal display device of any one of [1] to [10] is preferably a liquid crystal display device,
wherein the viewing-side polarizing plate has the first protective film.

According to the present invention, a liquid crystal display device exhibiting a high color reproducibility, prevented from occurring a display nonuniformity where it has been preserved under a high temperature and high humidity environment and then is lighted, and prevented from occurring a rainbow-like unevenness can be provided.

BRIEF DESCRIPTION OF THE DRAWING

In the drawing, L1 denotes a local minimum between the wavelengths of 460 nm to 520 nm, L2 denotes a local maximum between the wavelengths of 520 nm to 560 nm, and L3 denotes a local minimum between the wavelengths of 560 nm to 620 nm.

MODE FOR CARRYING OUT THE INVENTION

Hereinafter, the contents of the present invention will be described in detail. Description on constituent elements described below is made based on representative embodiments of the present invention, but the present invention is not limited to such embodiments. Further, the term "to" used before and after numerical values in the present specification is used to indicate the numerical values as the lower limit and the upper limit.

In the present specification, the term "full width at half maximum" means a width between two wavelengths which have half value of a height of the peak of a emission intensity spectrum.

[Liquid Crystal Display Device]

A liquid crystal display device of the present invention is a liquid crystal display device having at least alight source unit emitting light having a blue light emission intensity peak in the wavelength range of 400 to 500 nm, a green light emission intensity peak in the wavelength range of 500 to 600 nm and a red light emission intensity peak in the wavelength range of 600 to 680 nm, a light source unit-side polarizing plate, a liquid crystal cell and a viewing-side polarizing plate in this order, wherein the full width at half maximum of the green color emission intensity peak and the red color emission intensity peak are 20 nm or more, wherein the light emitted by the light source unit has a local minimum L1 in the wavelength range of 460 to 520 nm, a local maximum L2 in the wavelength range of 520 to 560 nm and a local minimum L3 in the wavelength range of 560 to 620 nm, wherein the local minimum L1 and the local minimum L3 are less than 35% of the local maximum L2, wherein at least one of the light source unit-side polarizing plate and the viewing-side polarizing plate has a polarizer and a first protective film disposed on the surface far from the liquid crystal cell of the polarizer, wherein an in-plane direction retardation at the wavelength of 589 nm Re(589) of the first protective film is 5,000 nm or more, wherein the moisture permeability at the temperature of 40° C. and the relative humidity of 90% is 100 g/m$^2$/day or less.

According to the above constitution, the liquid crystal display device of the present invention exhibits a high color reproducibility, is prevented from occurring a display nonuniformity where it has been preserved under a high temperature and high humidity environment and then is lighted, and is prevented from occurring a rainbow-like unevenness can be provided.

In the conventional liquid crystal display device, in the process of polarizing plate containing moisture being generally dried in a high humidity environment, bending of the liquid crystal cell occurred because of the contraction of the polarizing plate and then a part of the liquid crystal cell, for example, contacts the housing of the liquid crystal display device, which may cause a display nonuniformity. The liquid crystal display device of the present invention is prevented from occurring from bending of the liquid crystal cell where it has been preserved under a high temperature and high humidity environment and then is lighted and also prevented from occurring a display nonuniformity caused by the bending because the liquid crystal display device of the present invention has a protective film having low moisture permeability which prevents the contraction of the polarizing plate with preventing intrusion of moisture into the polarizer or preventing discharging of moisture from the polarizer.

Further, light transmitted through the polarizer becomes linearly polarized light. In case where the protective film has a large Re, the linearly polarized light undergoes a variety of phase variation for each wavelength by the phase difference (retardation) of the protective film. Moreover, because the light has a different reflection factor depending on the phase at the interface between the protective film and the air, it becomes transmittance of light is different for each wavelength, which causes the rainbow-like unevenness. To prevent it, the liquid crystal display device of the present invention is prevented from a rainbow-like unevenness by adjusting the Re of the first protective film larger than the specific range.

<Light Source Unit>

The liquid crystal display device of the present invention has a light source unit (sometimes referred to as a backlight) emitting light having a blue light emission intensity peak, a green light emission intensity peak and a red light emission intensity peak.

The light emitted from the light source unit in the liquid crystal display device of the present invention (in other words an emission intensity spectrum of the light source unit) has at least a blue, a green and a red light emission intensity peak. The full width at half maximum of the green color emission intensity peak and the red color emission intensity peak are 20 nm or more. The light emitted by the light source unit has a local minimum L1 in the wavelength range of 460 to 520 nm, a local maximum L2 in the wavelength range of 520 to 560 nm and a local minimum L3 in the wavelength range of 560 to 620 nm. The local minimum L1 and the local minimum L3 are less than 35% of the local maximum L2.

The full width at half maximum of the green color emission intensity peak and the red color emission intensity peak are preferably from 20 to 60 nm, more preferably from 20 to 40 nm, particularly more preferably from 25 to 40 nm. In case where the full width at half maximum of the green color emission intensity peak and the red color emission intensity peak are small, a color reproducibility of the liquid crystal display devise can be improved and it is preferable. Further, in case where the full width at half maximum of the green color emission intensity peak and the red color emission intensity peak are 20 nm or more, occurring of a rainbow-like unevenness can be prevented and it is preferable.

In addition, the full width at half maximum of the blue color emission intensity peak is preferably from 10 to 40 nm, more preferably from 20 to 40 nm.

The local minimum L1 and the local minimum L3 are preferably less than 20% of the local maximum L2, more preferably less than 10% of the local maximum L2. In case where the local minimum L1 and the local minimum L3 are less than 35% of the local maximum L2, emission intensity peak of blue color, green color and red color of light emitted from the light source unit is separated each other. A color reproducibility of the liquid crystal display devise can be improved by using such light which emission intensity peak of each color is separated each other and it is preferable.

In the liquid crystal display device of the present invention the local minimum L1 is preferably both local minimum and minimum L1' in the wavelength range of 460 to 520 nm. Also, the local maximum L2 is preferably both local maximum and maximum L2' in the wavelength range of 520 to 560 nm. Also, the local minimum L3 is preferably both local minimum and minimum L3' in the wavelength range of 560 to 620 nm.

A light emitting member included in the light source unit is not particularly limited, on condition that it is against the spirit of the present invention. The light source unit may have a three color independent LED having a red-emitting diode, a green-emitting diode and a blue-emitting diode, or it may have a blue color light emitting diode or an ultraviolet light emitting diode, and a fluorescent substance which is able to emit light by being excited by light from the blue color light emitting diode or an ultraviolet light emitting diode as a light emitting member. Among them, from the view point of reducing the cost, the light source unit preferably has a blue color light emitting diode or an ultraviolet light emitting diode, and a fluorescent substance which is able to emit light by being excited by light from the blue color light emitting diode or an ultraviolet light emitting diode as a light emitting member. In case where the blue color light emitting diode is used, the light source unit preferably has a fluorescent substance being able to emit green light by being excited by light from the blue color light emitting diode and a fluorescent substance being able to emit red light which by being excited by light from the blue color light emitting diode as light emitting members. In case where the ultraviolet light emitting diode is used, the light source unit preferably has a fluorescent substance being able to emit blue light by being excited by light from the blue color light emitting diode, a fluorescent substance being able to emit green light by being excited by light from the blue color light emitting diode, and a fluorescent substance being able to emit red light which by being excited by light from the blue color light emitting diode as light emitting members.

Inside the light source unit, the fluorescent substance may be sealed inside the blue light emitting diodes or ultraviolet emitting diodes, and the fluorescent substance sealed inside the glass tube may be arranged so that light emitted from the blue light emitting diodes or ultraviolet emitting diode reaches to the fluorescent substance, or the fluorescent substance including film may be arranged so that light emitted from the blue light emitting diodes or ultraviolet emitting diode reaches to the fluorescent substance including film. Among them, inside the light source unit, it is preferable that the fluorescent substance sealed inside the glass tube may be arranged so that light emitted from the blue light emitting diodes or ultraviolet emitting diode reaches to the fluorescent substance and that the fluorescent substance including film may be arranged so that light emitted from the blue light emitting diodes or ultraviolet emitting diode reaches to the fluorescent substance including film to prevent from deterioration of the fluorescent substance by heat.

The fluorescent substance preferably includes at least one quantum dot. Quantum dots are semiconductor particles of nanometer size. The fluorescent substance preferably includes at least one quantum dot can reduce the full width at half maximum of the color which the fluorescent substance emits emission intensity peak. And so, it is possible to improve the color reproducibility of the liquid crystal display device using the fluorescent substance including quantum dots inside of the light source unit and it is preferable.

In general, the luminous efficiency of the light source unit having a fluorescent substance including quantum dots is high. Therefore, in case of the same brightness, heat generation from the light source unit using a fluorescent substance including quantum dots can be more suppressed than that of a light source unit having a blue light-emitting diodes, green light emitting diodes and red light emitting diodes, a light source unit having a white color LED and a light source unit using the Cold Cathode Fluorescent Lamp (CCFL). Therefore, by using a light source unit having a fluorescent substance including quantum dots, the temperature rise can be easily suppressed when it is lit after the liquid crystal display device has been preserved under a high temperature and high humidity environment, and a bending of the liquid crystal cell can be easily prevented from occurring and also a display nonuniformity can be further prevented from occurring.

In addition, a relationship between wavelengths and intensity of the light emitted from the light source unit, that is an emission intensity spectrum of the light source unit, can be measured with the use of a spectral radiometer "SR-3" manufactured by TOPCON TECHNOHOUSE CORPORATION.

Figure 1:
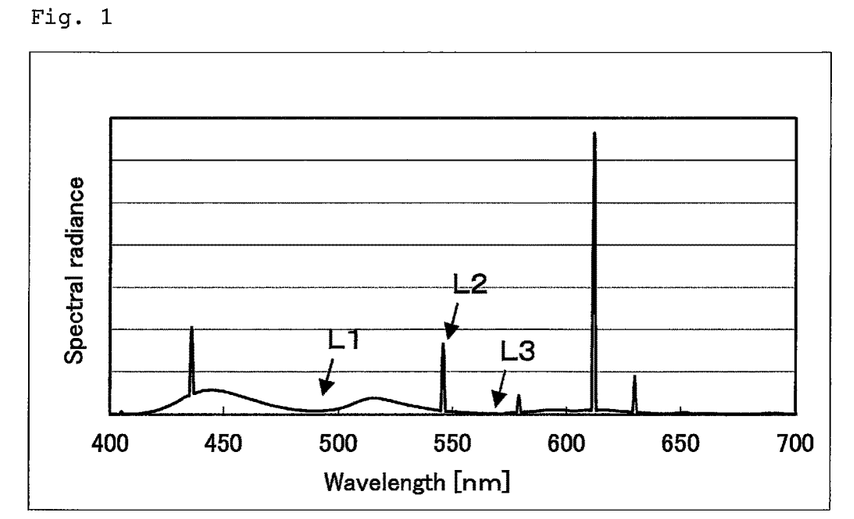
FIG. 1 is an emission intensity spectrum of a light source having a general Cold Cathode Fluorescent Lamp, or CCFL.

FIG. 1 is an emission intensity spectrum of a light source unit having a general Cold Cathode Fluorescent Lamp (CCFL). In FIG. 1 and after mentioned FIG. 2 and FIG. 3, the horizontal axis of the graph represents a wavelength and the vertical axis represents a spectral radiance (the relative value of spectral radiance or emission intensity). Color reproduction of the general liquid crystal display device having a CCFL is superior than that of the liquid crystal display having white color LED because the emission intensity spectrum of the light source unit using the CCFL has a sharp emission intensity peaks in blue, green and red and therefore the blue, green and red emission is separated thereof. On the other hand, since the full width at half maximum of the green and red emission intensity peaks are as small about 2 nm or less, in case where a film having a high Re as the first protective film, rainbow-like unevenness is visually recognized.

Figure 2:
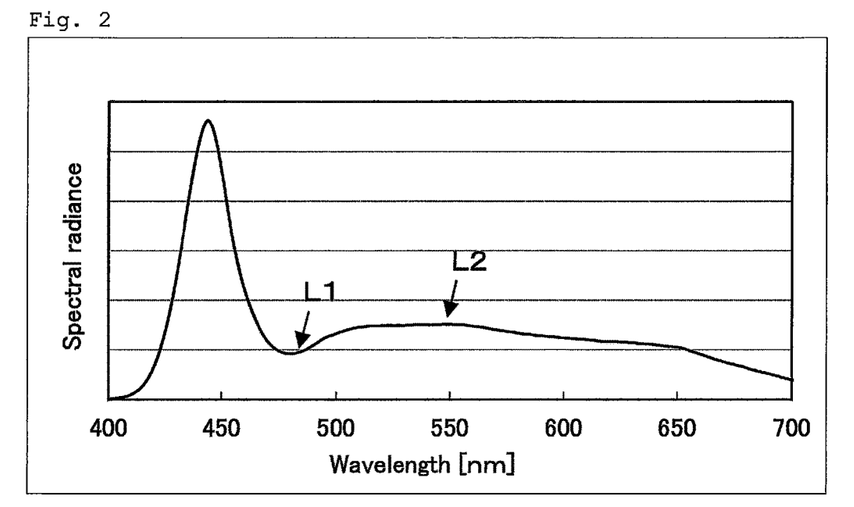
FIG. 2 is an emission intensity spectrum of a light source having a white color LED.

FIG. 2 is an emission intensity spectrum of a light source unit having a white color LED. The white color LED is generally manufactured by sealing a fluorescent substance being able to emit yellow light or a fluorescent substance being able to emit green and red light (preferably organic fluorescent substance) inside the blue light emitting diode. In this case, in the emission intensity spectrum of the light source unit using the white color LED, the full width at half maximum of the green color emission intensity peak and the red color emission intensity peak become 20 nm or more. And so the rainbow-like unevenness is prevented from occurring in case where a film having high Re is used as the first protective film in the liquid crystal display device having the general white color LED. On the other hand, since the emission intensity spectrum of the general white color LED does not have a local minimum L1 in the wavelength range of 460 to 520 nm, or does not have a local minimum L3 in the wavelength range of 560 to 620 nm, or the local minimum L1 and the local minimum L3 are less than 35% of the local maximum, emission intensity peak of blue color, green color and red color of light emitted from the light source unit is not separated each other sufficiently. As a result, a color reproducibility of liquid crystal display device of the present invention having the light source unit satisfying the property of the present invention is better than a liquid crystal display device having a light source unit using a general white color LED.

Figure 3:
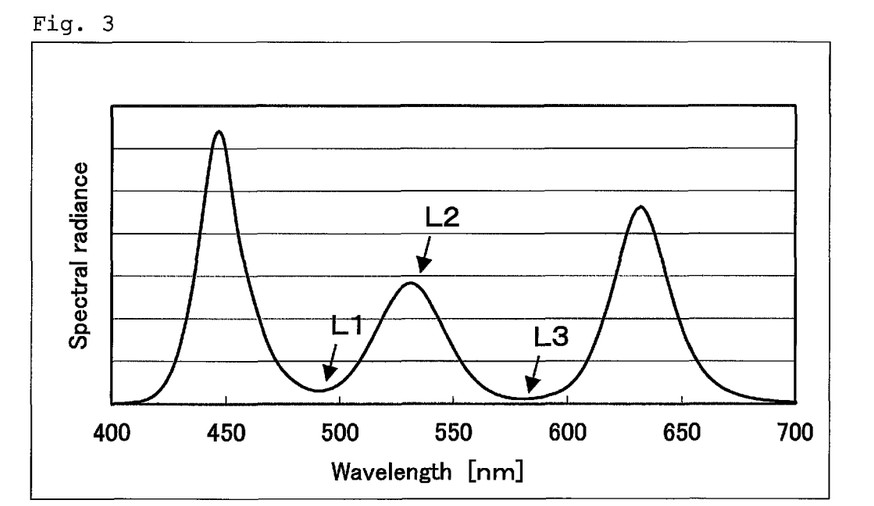
FIG. 3 is an emission intensity spectrum of a light source having a fluorescent substance including a quantum dot.

FIG. 3 is an emission intensity spectrum of a light source unit having a fluorescent substance including a quantum dot. Since this emission intensity spectrum is generally one that has the full width at half maximum of the green color emission intensity peak and the red color emission intensity peak are 20 nm or more, and that the light emitted by the light source unit has a local minimum L1 in the wavelength range of 460 to 520 nm, a local maximum L2 in the wavelength range of 520 to 560 nm and a local minimum L3 in the wavelength range of 560 to 620 nm, and that the local minimum L1 and the local minimum L3 are less than 35% of the local maximum L2, and so it is preferably used as the light source unit of the liquid crystal display device of the present invention.

<Polarizing Plate>

Figure 4:
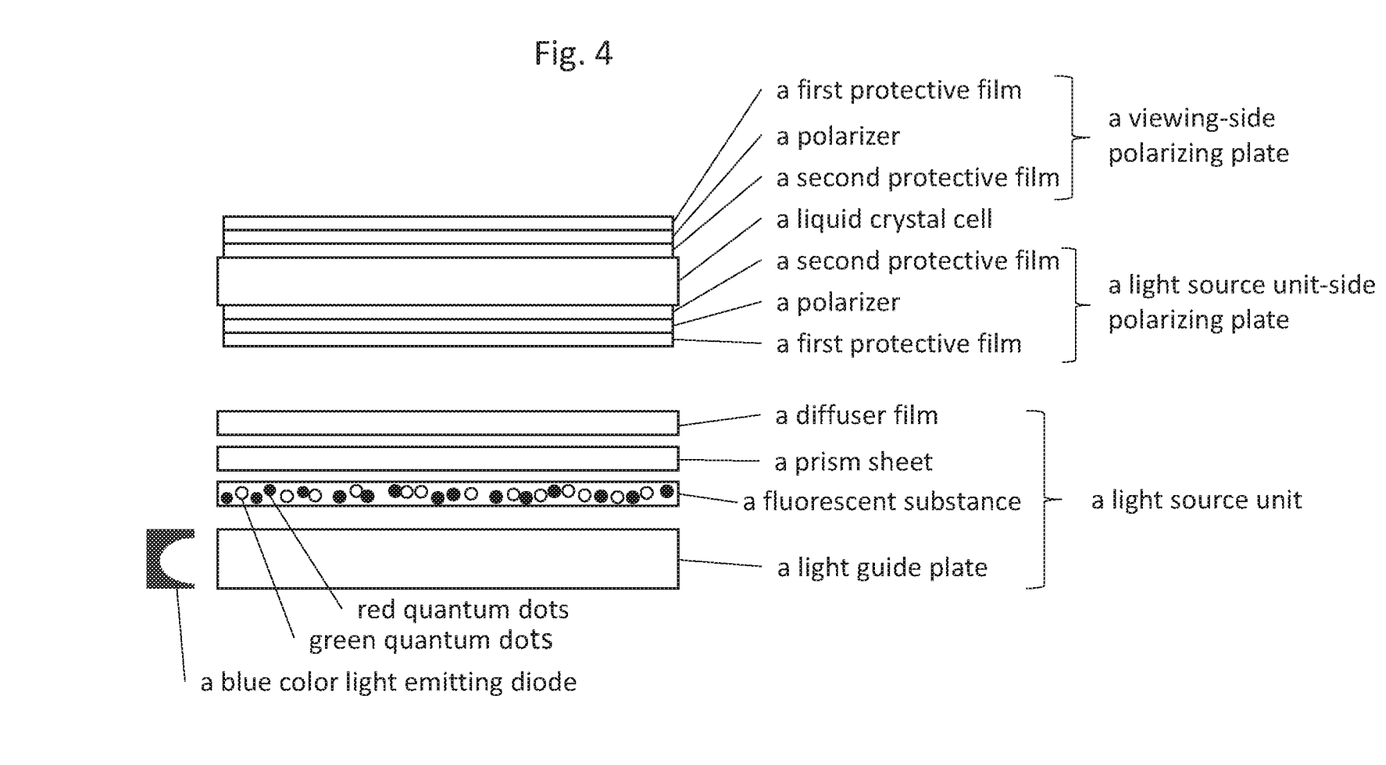
FIG. 4 is a liquid crystal display device.

The liquid crystal display device of the present invention (see FIG. 4) has a light source-side polarizing plate and a viewing-side polarizing plate, and at least one of the light source unit-side polarizing plate and the viewing-side polarizing plate has a polarizer and a first protective film disposed on the surface far from the liquid crystal cell of the polarizer.

In the liquid crystal display device of the present invention, the viewing-side polarizing plate preferably has the first protective film.

In addition, in the liquid crystal display device of the present invention, the light source unit-side polarizing plate may have the first protective film or it may not have the first protective film. Further, as the light source unit-side polarizing plate, it is possible to use any light source unit-side polarizing plate in known liquid crystal display devices.

In case where the first protective film has an easy-adhesion layer on the side of the polarizer described later, the polarizing plate of the liquid crystal display device of the present invention can be manufactured by laminating or bonding the easy-adhesion layer on the side of the polarizer of the first protective film and the polarizer.

As an adhesive, conventionally known adhesives can be used and, for example, the adhesive includes acrylic compounds such as polyvinyl alcohol, polyvinyl butyral, polybutyl acrylate; epoxy compound having alicyclic epoxy group which is exemplified by a glycidyl group or an epoxy-cyclohexane.

Herein under describes a preferred embodiment of the each member constituting the polarizing plate having first protective film.

(First Protective Film)

The first protective film is disposed on the surface far from the liquid crystal cell of the polarizer, has an in-plane direction retardation at the wavelength of 589 nm Re(589) of the first protective film is 5,000 nm or more, and the moisture permeability thereof at the temperature of 40° C. and the relative humidity of 90% is 100 g/m²/day or less.

Herein under describes a preferred embodiment of the first protective film.

—Property—
——Retardation——

The first protective film has an in-plane direction retardation at the wavelength of 589 nm Re(589) of the first protective film is 5,000 nm or more, preferably from 7,000 to 30,000 nm, more preferably from 8,000 to 30,000 nm.

By controlling Re(589) in the above range, the rainbow-like unevenness can be prevented from occurring in case where the first protective film is disposed in the liquid crystal display device. In addition, there is no upper limit of Re(589) of the first protective film for preventing the occurring the rainbow-like unevenness. Re(589) of the first protective film is preferably 30,000 nm or less from the viewpoint of recent trend of thin liquid crystal display device because it is necessary to thicken the film to exhibit Re(589) more than 30,000 nm.

Further, Re(589) is preferably from 10,000 to 30,000 nm from the viewpoint of preventing from occurring the rainbow-like unevenness in case where the full width at half maximum of the green color emission intensity peak and the red color emission intensity peak of the light source unit are small (for example, 20 to 30 nm), more preferably from 12,000 to 30,000 nm, particularly preferably from 14,000 to 30,000 nm.

Further, the ratio of the in-plane direction retardation at the wavelength of 589 nm Re(589) and a thickness direction retardation at the wavelength of 589 nm Rth(589) Re(589)/Rth(589) of the first protective film is preferably 0.8 to 2.0, more preferably 0.9 to 1.5.

In case where the Re(589)/Rth(589) is 0.8 or more, the rainbow-like unevenness can be prevented from occurring when the first protective film is disposed in the liquid crystal display device and the liquid crystal display device is observed in oblique direction and it is preferable. Further, in case whether the Re(589)/Rth(589) is 2.0 or less, it is easy to produce the first protective film and it is preferable. In case whether the Re(589)/Rth(589) is from 0.9 to 1.5, it is easier to produce the first protective film than above situation and it is more preferable.

Further, from the viewpoint of preventing from occurring the rainbow-like unevenness in case where the full width at half maximum of the green color emission intensity peak and the red color emission intensity peak are small (for example, 20 to 30 nm), the Re(589)/Rth (589) is preferably from 1.1 to 1.5, more preferably from 1.2 to 1.5, particularly preferably from 1.3 to 1.5.

In addition, a preferably range of the thickness direction retardation at the wavelength of 589 nm Rth(589) of the first protective film is not limited by the absolute value thereof and it is preferable to satisfy above Re(589)/Rth(589) range.

The in-plane direction retardation (Re) of the first protective film is determined by the following formula (1) and the thickness direction retardation (Rth) of it is determined by the following formula (2):

$$Re = (nx - ny) \times d \qquad (1)$$

$$Rth = \{(nx + ny)/2 - nz\} \times d \qquad (2)$$

In formula (1) and formula (2), nx represents a refractive index in the slow axis direction in the in-plane of the first protective film, ny represents a refractive index in the fast axis direction in the in-plane of the first protective film, nz represents a refractive index in the thickness direction of the first protective film, and d represents a thickness of the first protective film. Refractive indexes nx, ny and nz of the prepared first protective film can be measured using "Abbe Refractometer NAR-4T" manufactured by Atago Inc. and sodium vapor lamp.

——Moisture Permeability——

The moisture permeability of the first protective film is measured according to JIS (Japanese Industrial Standards) Z-0208 under the condition 40° C., relative humidity 90%.

The moisture permeability of the first protective film at the temperature of 40° C. and the relative humidity of 90% is 100 g/m²/day or less, preferably from 0 to 100 g/m²/day from the viewpoint from making the film hydrophobic, more preferably from 0 to 50 g/m²/day, further preferably from 0 to 30 g/m²/day.

——Film Thickness——

The film thickness (also referred to a thickness) of the first protective film is preferably from 10 to 500 μm. The film thickness of the first protective film is more preferably from 15 to 400 μm, further preferably 20 to 200 μm, most preferably from 40 to 100 μm. In order to make the liquid crystal display device thickness thin, the first protective film is preferably thin, but from the viewpoint of transportability and workability, the film thickness is preferably 10 μm or more.

—Composition—

There is no particular limitation to the composition of a film satisfying the optical properties of the first protective film used in a liquid crystal display device of the present invention and a material constituting the first protective film.

Herein under describes the composition of the first protective film and the material constituting the first protective film.

As the material constituting the first protective film, for example, a thermoplastic resin superior in transparency, mechanical strength, thermal stability, moisture barrier properties, isotropy or the like (such as polyester resin or polycarbonate resin) can be used as a main ingredient. The main ingredient is a material which constitutes 50% or more by mass of the first protective film.

The first protective film, in addition to the aforementioned thermoplastic resin material, one or more any suitable additives may be contained. As additives, for example, include ultraviolet absorbent, particles, lubricants, antiblocking agents, heat stabilizers, antioxidants, antistatic agents, light stabilizer, impact modifiers, dyes, pigments, etc. The amount of the thermoplastic resin in the first protective film is preferably from 50 to 100% by mass, more preferably from 50 to 99% by mass, further preferably from 60 to 98% by mass, particularly preferably from 70 to 97% by mass. In case where the amount of the thermoplastic resin in the first protective film is 50% or more by mass, high transparency or the like which a thermoplastic resin inherently has can be expressed enough.

The first protective film may be a monolayer film, or may be a multilayer film. Further, these single-layer films or multi-layer films may be applied a surface treatment on both sides thereof or one side thereof. The surface treatment may be a surface modification by a corona treatment, a saponification treatment, a heat treatment, an ultraviolet irradiation, an electron beam irradiation or the like, or may be a thin film formation by coating or vapor deposition of a polymer, metal compound, etc.

Further, an easy-adhesion layer described later may be formed to improve adhesive with the polarizer.

——Polyester Resin——

The first protective film is preferably a polyester film including a polyester resin as a main ingredient. Further, the first protective film is preferably a polyester film which is stretched at least in uniaxial direction.

The polyester resin includes polyethylene terephthalate, polyethylene isophthalate, polyethylene-2,6-naphthalate, polybutylene terephthalate, include 1,4-cyclohexane dimethylene terephthalate and two or more thereof may be used as it is needed. Among them, polyethylene terephthalate and polyethylene-2,6-naphthalate are preferably used. That is, in the liquid crystal display device of the present invention, the first protective film is preferably a polyethylene terephthalate film or a polyethylene-2,6-naphthalate film. From the viewpoint of the material cost, polyethylene terephthalate is preferably used, that is, in the liquid crystal display device of the present invention, the first protective film is preferably a polyethylene terephthalate film. On the other hand, from the viewpoint of reducing the moisture permeability of the same film thickness when it is thinned and improving the display nonuniformity after a moisture-heat aging, it is more preferable to use polyethylene-2,6-naphthalate.

Polyethylene terephthalate is a polyester having a construction unit derived from terephthalic acid as the dicarboxylic acid component and a constituent unit derived from ethylene glycol as the diol component. Polyethylene terephthalate preferably has 80% or more ethylene terephthalate and may have another construction unit derived from another copolymerizing component. Another copolymerizing component includes dicarboxylic acid component such as isophthalic acid, para-β-oxyethoxy benzoic acid, 4,4'-dicarboxylic biphenyl, 4,4'-dicarboxy benzophenone, bis(4-carboxyphenyl) ethane, adipic acid, sebacic acid, 5-sodium sulfo-isophthalic acid, 1,4-dicarboxy cyclohexane; and diol component such as propylene glycol, butanediol, neopentyl glycol, diethylene glycol, cyclohexane diol, ethylene oxide adduct of bisphenol A, polyethylene glycol, polypropylene glycol, polytetramethylene glycol of and the like. These dicarboxylic acid component and diol component can be used in combination of 2 or more kinds of them if it is needed. Further, it is also possible to use an oxycarboxylic acid such as para-oxybenzoic acid with above dicarboxylic acid component and diol component. As another copolymerizing component, dicarboxylic acid component and/or diol component having in small quantity of amide bond, urethane bond, ether bond, carbonate bond, of the like. The method for producing polyethylene terephthalate can be applied to any production process such as a direct polymerization method which terephthalic acid, ethylene glycol and with other dicarboxylic acids and/or other diols if necessary reacted directly; and a transesterification method which dimethyl ester of terephthalic acid, ethylene glycol and with other dimethyl esters of dicarboxylic acids and/or other diols if necessary reacted to perform transesterification; or the like.

——Polycarbonate Resin——

The first protective film preferably includes a polycarbonate resin as a main ingredient.

As a polycarbonate resin, known resins can be used. For example it includes polycarbonate resins having a bisphenol A skeleton. The polycarbonate resin having a bisphenol A skeleton is obtained by reacting a dihydroxy component and a carbonate precursor with interfacial polymerization or melt polymerization method. As the polycarbonate resin having a bisphenol A skeleton, for example, described in JP-A-2006-277914, JP-A-2006-106386 JP-A-2006-284703 can be used preferably. Examples of commercially available products of the polycarbonate resin having a bisphenol A skeleton includes "Tarflon MD1500" made by IDEMITSU KOSAN CO., LTD. Polycarbonate resins may be used two or more of them, if necessary.

——Ultraviolet Absorbent——

In the first protective film, it is preferable to include an ultraviolet absorbent to prevent from deteriorate of the liquid crystal or the like by ultraviolet ray. As the ultraviolet absorbent, it is not particularly limited, on condition that it exhibits ultraviolet absorbance and it is heat resistant against heat in the manufacturing steps of the first protective process.

As the ultraviolet absorbent, there are known an organic ultraviolet absorbent and an inorganic ultraviolet absorbent. In view of a good transparency, among these ultraviolet absorbents, the organic ultraviolet absorbent is preferred. Examples of the organic ultraviolet absorbent include benzotriazole-based ultraviolet absorbents, hydroxyphenyltriazine-based absorbents and benzoxazine-based ultraviolet absorbents. In the present invention, for example, 2,2'-(paraphenylene)-di-3,1-benzoxazine-4-one (manufactured by FUJIFILM Finechemicals Co., Ltd, product name UVSORB 101) is preferably used as an ultraviolet absorbent. Two or more ultraviolet absorbents which exhibit different wavelength of the maximum absorbance from each other may be used in combination to enlarge the width of the ultraviolet absorbing range. The amount of the ultraviolet absorbent incorporated in the first protective film against resin in the first protective film is preferably in the range of 0.01 to 2.0% by mass and more preferably 0.01 to 1.5% by mass.

The first protective film in the form of a multilayer film preferably has at least three layered structure. In this case, the ultraviolet absorbent is preferably incorporated in an intermediate layer thereof. By incorporating the ultraviolet absorbent in the intermediate layer, the ultraviolet absorbent can be prevented from being bled out onto the surface of the film, so that the resulting film can maintain its properties such as adhesion property.

—Manufacturing Method of First Protective Film—

The manufacturing method of the first protective film is not particularly limited and the first protective film is preferably manufactured by the following method in order to impart the above characteristics.

At first, the resin used for the first protective film (such as polyester resin) is melt extruded in a film form, and then it is cooled and solidified by a casting drum to obtain a non-stretch film. After the non-stretch film is obtained, if necessary, a coating solution for (forming) an easy-adhesion layer may be applied on it. The non-stretch film is preferably stretched 3 to 10 times, preferably 3 to 7 times, in the width direction at a temperature of Tg to (Tg+60)° C. Tg is a Tg of the polyester film. The first protective film is preferably a polyester film which stretched at least in uniaxial direction, more preferably a polyester film which stretched at least in width direction and in uniaxial direction from the viewpoint of expressing the in-plane retardation Re largely.

Next, it is preferably carried out a thermal treatment at 140 to 220° C. for 1 to 60 seconds (referred to herein as thermal fixation). The temperature of the thermal fixation is more preferably at 150 to 220° C., particularly preferably at 150° C. or more and less than 220° C.

Further, it is preferably carried out a re-thermal treatment at a temperature 10 to 20° C. lower than that of the thermal fixation and contracting 0 to 20% in the longitudinal or/and in the transverse direction (referred to herein as thermal relaxation). In this method, it is advantageous for application to optical applications since the film has few contact with the roll and so the fine scratches, etc. on the film surface is hardly possible than the aforementioned method. In addition, Tg represents a glass transition temperature of a film. In case where the temperature of the thermal fixation is at 150° C. or more and less than 220° C., the shift of the orientation direction of the resin used for the first protective film is decreased and the thermal dimensional change is also small, which is preferable. In particular, in case where the first protective film has a hard coat layer described below, peeling or cracking of the hard coat layer is less likely to occur.

—Easy-Adhesion Layer—

The first protective film preferably has an easy-adhesion layer for adhesive to other member. For example, to improve an adhesive property to a polarizer, an easy-adhesion layer on the side of the polarizer may be disposed on the surface laminated to the polarizer of the first protective film. Also, to improve an adhesive property to a polarizer, an easy-adhesion layer on the side of the hard coat may be disposed on the surface laminated to the after mentioned hard coat layer of the first protective film.

In the present invention, the film thickness of the easy-adhesion layer on the first protective film is usually in the range of 0.02 to 1.0 μm, preferably 0.03 to 0.5 μm and more preferably 0.04 to 0.2 μm. To impart a sufficient adhesion property, the film thickness of the easy-adhesion layer is preferably 0.02 μm or more. To obtain superior appearance, transparency, and anti-blocking property film, the film thickness of the easy-adhesion layer is preferably less than 1.0 μm.

In the present invention, as the method of forming the easy-adhesion layer on the first protective film, there may be used conventionally known coating methods such as a reverse gravure coating method, a direct gravure coating method, a roll coating method, a die coating method, a bar coating method and a curtain coating method. Regarding to coating methods, examples are described in Yuji HARAZAKI, "Coating Methods", Maki-shoten, 1979.

In the present invention, the drying and curing conditions used upon forming the easy-adhesion layer on the first protective film are not particularly limited. For example, in the case where the easy-adhesion layer is formed in an off-line coating method, the easy-adhesion layer may be subjected to heat treatment usually at a temperature of 80 to 200° C. for 3 to 40 seconds and preferably at a temperature of 100 to 180° C. for 3 to 40 seconds.

On the other hand, in the case where the easy-adhesion layer is formed in an in-line coating method, the easy-adhesion layer may be subjected to heat treatment usually at a temperature of 70 to 280° C. for 3 to 200 seconds.

In any of the off-line coating and in-line coating methods, the heat treatment may be used in combination with irradiation with active energy rays such as irradiation with ultraviolet rays, if required. The first protective film in the present invention may be previously subjected to surface treatments such as corona treatment and plasma treatment.

—Conductive Layer—

The first protective film may be a transparent conductive film having a conductive layer on at least one surface thereof. In this case, the first protective film can be used as an antistatic film or an electrode film of a touch panel. As the conductive layer, for example, conductive layers described in JP-A-2013-1009, JP-A-2012-216550, JP-A-2012-151095, JP-A-2012-25158, JP-A-2011-253546, JP-A-2011-197754, JP-A-2011-34806, JP-A-2010-198799, JP-A-2009-277466, JP-A-2012-216550, JP-A-2012-151095, WO2010/140275 pamphlet and WO2010/114056 pamphlet can be used.

—Hard Coat Layer—

The first protective film may have a hard coat layer on at least one surface thereof. In this case, scratch resistance of the film can be improved. The first protective film can be used as a support of an antireflection film. In the case of image display devices with high definition and high grade as in liquid crystal display device, in addition to a dust resistance or the scratch resistance, for the purpose of preventing lowering of contrast to be caused due to reflection of external light on the display surface or glaring of an image, an antireflection film is preferably used.

JP-A-2000-111706 can be referred to as a composition and a manufacturing method of the hard coat layer and the content of this reference is hereby expressly incorporated by reference, in its entirety, into the present invention and specification.

(Polarizer)

As the polarizer, a film obtained by adsorbing and aligning iodine on a polymer film is preferably used. The polymer film is not particularly limited, and various polymer films can be used. Examples thereof include a polyvinyl alcohol based film, a polyethylene terephthalate based film, an ethylene/vinyl acetate copolymer based film, and a partially saponified film thereof, a hydrophilic polymer film such as a cellulose based film, and a polyene based aligned film such as a dehydration product of polyvinyl alcohol or a dehydrochlorination product of polyvinyl chloride. Among these, a polyvinyl alcohol based film having excellent dyeability with iodine is preferably used as the polarizer.

For a material of the polyvinyl alcohol based film, polyvinyl alcohol or a derivative thereof is used. Examples of the polyvinyl alcohol derivative include polyvinyl formal and polyvinyl acetal, and besides, those obtained by modifying polyvinyl alcohol with an olefin such as ethylene and propylene, an unsaturated carboxylic acid such as acrylic acid, methacrylic acid, and crotonic acid, or an alkyl ester thereof, acrylamide, etc.

The polymer film (non-stretch film) is at least subjected to a uniaxial stretching treatment and an iodine dyeing treatment according to the usual way. Furthermore, the polymer film can be subjected to a boric acid treatment and a washing treatment. Also, the thus treated polymer film (stretching film) is dried according to the usual way, thereby forming a polarizer.

(Second Protective Film)

In the polarizing plate, second protective film can be disposed on the opposite side to the surface where the first protective film is disposed in the both surface of the polarizer.

As a material of the second protective film, thermoplastic resins which are excellent in transparency, mechanical strength, heat stability, moisture-blocking properties, isotropy, etc. are preferably used. Such thermoplastic resins are not limited. Such thermoplastic resins include, for example, cellulose acylate resins, (meth)acrylic resins, cyclic polyolefin resins, polyarylate resins.

The second protective film can provide a function of improving viewing angle to the liquid crystal panel by properly controlling the retardation thereof.

<Liquid Crystal Cell>

The liquid crystal display device of the present invention has a liquid crystal cell.

Drive modes of the liquid crystal cell of the liquid crystal display device may be VA (Vertical Alignment) mode, IPS (In-Plane Switching) mode, TN (Twisted Nematic) mode, ECB (Electrically Controlled Birefringence) mode, or the other mode.

In a liquid crystal cell in the VA mode, rod-like liquid crystalline molecules are substantially vertically aligned when no voltage is applied. The liquid crystal cells in the VA mode include (1) liquid crystal cells in the VA mode in a narrow sense in which rod-like liquid crystalline molecules are aligned substantially vertically when no voltage is applied but substantially horizontally when a voltage is applied (described in Japanese Patent Application Laid-Open No. 112-176625), (2) liquid crystal cells in VA mode which is multidomained to expand the viewing angle (MVA mode) (described in SID97, Digest of Tech. Papers (Proceedings) 28 (1997), 845), (3) liquid crystal cells in a mode (n-ASM mode) in which rod-like liquid crystalline molecules are aligned substantially vertically when no voltage is applied but aligned in twisted multidomained mode when a voltage is applied (described in Proceedings of Symposium on Japanese Liquid Crystal Society 58 to 59 (1988) and (4) liquid crystal cells in a SURVIVAL mode (reported in LCD international 98).

The liquid crystal cell of IPS mode adopts a mode of switching by application of a lateral electric field to nematic liquid crystal, and details thereof are described in Proc. IDRC (Asia Display '95), pp. 577-580 and pp. 707-710.

In a TN-mode liquid crystal cell, rod-shaped liquid crystalline molecules are aligned in a substantially horizontal direction, and that in a state of being twisted by 60° to 120°, when no voltage is applied thereto. TN-mode crystal cells are prevailingly utilized in color TFT (thin film transistor) liquid crystal display devices, and described in an abundant technical literature.

In an ECB-mode liquid crystal cell, rod-shaped liquid crystalline molecules are aligned in a substantially horizontal direction. The ECB mode is one of liquid crystal display modes having the most simple structures, and described, e.g., in JP-A-5-203946.

EXAMPLES

Hereinafter, characteristics of the present invention will be described in more detail with reference to Examples. The materials, amounts, ratios, operations, order of operations, and the like shown in the Examples below may appropriately be modified without departing from the spirit of the present invention. Therefore, the scope of the present invention should not be construed as being limited by specific Examples shown below.

Manufacturing Examples

<Preparation of Light Source Unit>
(Light Source Unit Used In Example 1 and 9 and Comparative Example 1 and 6)

The light source unit of a liquid crystal TV manufactured by SONY Corporation "KDL-46W900A" which includes a blue color LED as a light source and a fluorescent substance including a quantum dot sealed in a glass tube disposed between the light source and a liquid crystal cell is used as alight source unit used in Example 1 and 9 and Comparative Example 1 and 6. An emission intensity spectrum of the light source unit was measured with the use of a spectral radiometer (product name SR-3, TOPCON TECHNOHOUSE CORPORATION). As a result, the emission intensity spectrum of the light source unit has an emission intensity peak in the each range of blue color, green color and red color. The full width at half maximum of the green color emission intensity peak is 37 nm, the full width at half maximum of the red color emission intensity peak is 31 nm. The emission intensity spectrum of the light source unit has a local minimum L1 at the wavelengths of 491 nm, a local maximum L2 at the wavelengths of 531 nm and a local minimum L3 at the wavelengths of 580 nm. L1/L2 is 11% and L3/L2 is 4%. These results were shown in Table 1 below.

(Light Source Unit Used In Example 2)

Optical wavelength conversion member 1 including a quantum dot as a fluorescent substance was manufactured according to following method. In addition, as a quantum dot, goods commercially available such as made by Sigma-Aldrich can be used without any limitation. Further, an emission wavelength and the full width at half maximum of the emission intensity peak can be modified arbitrarily by controlling a particle diameter and/or particle diameter distribution.

Quantum dot dispersion 1 below was prepared and filtered by a filter made of poly propylene having 0.2 μm pore size. After filtration, the filtrate was dried under reduced pressure for 30 minutes and was used as a coating solution.

| Quantum dot dispersion 1 | |
| --- | --- |
| Toluene dispersion of quantum dot 1 (emission local maximum wavelength: 530 nm) | 10 parts by mass |
| Toluene dispersion of quantum dot 2 (emission local maximum wavelength: 630 nm) | 1 parts by mass |

-continued

| Quantum dot dispersion 1 | |
|---|---|
| Lauryl methacrylate | 2.4 parts by mass |
| Trimethylol propane triacrylate | 0.54 parts by mass |
| Photopolymerization initiator (IRGACURE 819 (made by BASF)) | 0.009 parts by mass |
| Silane coupling agent A | 0.09 parts by mass |

Silane coupling agent A (In above structural formula, R represents $CH_2CHCOOCH_2$. Silane coupling agent A was synthesized by referring to the method in JP-A-2009-67778)

Quantum dot dispersion 1 prepared by above method was coated on a polyethylene terephthalate film "A4300" made by Toyobo Co., Ltd. with 100 μm thickness. Another polyethylene terephthalate film "A4300" was covered on a coated film and a ultraviolet light was radiated to one of the polyethylene terephthalate film "A4300" side using (by Eye Graphics Co., Ltd.) and air-cooled metal halide lamp 160 W/cm so that the coated film was cured and the optical wavelength conversion film 1 was prepared.

From the light source unit of a liquid crystal TV manufactured by SONY Corporation "KDL-46W900A", the glass tube sealing fluorescent substance and the diffusion sheet were removed. The optical wavelength conversion film 1 was disposed on the original light-guiding plate in "KDL-46W900A", and then the original diffusion sheet in "KDL-46W900A" was disposed so that the light source unit used in Example 2 was prepared.

The emission intensity spectrum of the light source unit used in Example 2 was measured and the result was shown in Table 1 below.
(Light Source Unit Used In Examples 3 to 7)

Light source unit used in Examples 3 to 7 were prepared in the same way as in Example 2, except that the kinds of quantum dot and compounding ratio were changed.

The emission intensity spectrum of the light source unit used in Examples 3 to 7 was measured and the result was shown in Table 1 below.
(Light Source Unit Used In Example 8)

The light source unit of a liquid crystal TV manufactured by SONY Corporation "KDL-46XR1" was used in Example 8. In addition, this light source unit includes a blue color light emitting diode, a green color light emitting diode and a red color light emitting diode.

The emission intensity spectrum of this light source unit was measured and the result was shown in Table 1 below.
(Light Source Unit Used In Comparative Examples 2 and 3)

The light source unit of a liquid crystal TV manufactured by SONY Corporation "KDL-52ZX5" was used in Comparative Examples 2 and 3. This light source unit includes a white color light emitting diode. Further, light emitted by the light source unit did not have a local minimum in the wavelength range of 560 to 620 nm, The emission intensity spectrum of this light source unit was measured and the result was shown in Table 1 below.
(Light Source Unit Used In Comparative Example 4)

The light source unit of a liquid crystal TV manufactured by SONY Corporation "KDL-40ZX1" was used in Comparative Example 4. This light source unit includes a white color light emitting diode.

The emission intensity spectrum of this light source unit was measured and the result was shown in Table 1 below.
(Light Source Unit Used In Comparative Example 5)

The light source unit of a liquid crystal TV manufactured by SONY Corporation "KDL-40F1" was used in Comparative Example 5. This light source unit includes a cold cathode fluorescent lamp (CCFL).

The emission intensity spectrum of this light source unit was measured and the result was shown in Table 1 below.
<Preparation of First Protective Film>
(First Protective Film Used For Example 1)

Polyethylene terephthalate (PET) film having thickness of 100 μm was manufactured by the following methods.
—Synthesis of Law Material Polyester—
——Raw Material Polyester 1——

As described below, raw material polyester 1 (Sb catalyst-based PET) was obtained by using a direction esterification method in which esterification is performed by directly reacting terephthalic acid with ethylene glycol and distilling water away therefrom, and then polycondensation is performed under reduced pressure by using a continuous polymerization apparatus.
(1) Esterification Reaction 4.7 tons of high-purity terephthalic acid was mixed with 1.8 tons of ethylene glycol in a first esterification reaction tank over 90 minutes to form slurry, and the slurry was continuously supplied to the first esterification reaction tank at a flow rate of 3800 kg/h. Moreover, an ethylene glycol solution containing antimony trioxide was continuously supplied thereto, and a reaction was performed at an internal temperature of the reaction tank of 250° C. under stirring by setting an average residence time to about 4.3 hours. At this time, the antimony trioxide was continuously added such that the amount of Sb added became 150 ppm (parts per million) which being expressed in terms of the element.

The reaction product was transferred to a second esterification reaction tank and reacted at an internal temperature of the reaction tank of 250° C. under stirring by setting an average residence time to 1.2 hours. In the inside of the second esterification reaction tank, an ethylene glycol solution containing magnesium acetate and an ethylene glycol solution containing trimethyl phosphate were continuously supplied such that the amount of Mg and P added each became 65 ppm and 35 ppm which being expressed in terms of the element.
(2) Polycondensation Reaction The product of the esterification reaction obtained as above was continuously supplied to a first polycondensation reaction tank and subjected to polycondensation at a reaction temperature of 270° C. and an internal pressure of the reaction tank of 20 torr ($2.67 \times 10^{-3}$ MPa) under stirring by setting an average residence time to about 1.8 hours.

Thereafter, the resultant was transferred to a second polycondensation reaction tank and subjected to a reaction (polycondensation) in the reaction tank under stirring, under the conditions of an internal temperature of the reaction tank of 276° C., an internal pressure of the reaction tank of 5 torr ($6.67 \times 10^{-4}$ MPa), and a residence time of about 1.2 hours.

Subsequently, the resultant was transferred to a third polycondensation reaction tank. In this tank, the resultant was subjected to a reaction (polycondensation) under the conditions of an internal temperature of the reaction tank of 278° C., an internal pressure of the reaction tank of 1.5 torr ($2.0 \times 10^{-4}$ MPa), and a residence time of about 1.5 hours, thereby obtaining a reaction product (polyethylene terephthalate (PET)).

The obtained reaction product was then ejected in a form of a strand to cold water and cut immediately, thereby producing polyester pellets (cross section: a major axis of about 4 mm, a minor axis: about 2 mm, a length: about 3 mm). The obtained polymer had intrinsic viscosity (IV) of 0.63. This polymer is named as raw material polyester 1.

To determine the IV, raw material polyester 1 was dissolved in a mixed solvent of 1,1,2,2-tetrachloroethane/phenol (mass ratio: 2/3), and IV was determined from the solution viscosity at 25° C. in the mixed solvent.

——Raw Material Polyester 2——

10 mass parts of dried ultraviolet absorbent 2,2'-(paraphenylene)-di-3,1-benzoxazine-4-one and 90 mass parts of raw material polyester 1 (IV=0.63) were mixed by a kneading extruder and then a raw material polyester 2 having ultraviolet absorbent was obtained.

—Film Formation Step—

The raw material polyester 1 (90 mass parts) and the raw material polyester 2 having ultraviolet absorbent (10 mass parts) were dried until the moisture content thereof became 20 ppm or less, and then put into a hopper 1 of a uniaxial kneading extruder 1 having a diameter of 50 mm. Under the following extrusion condition, the raw materials were melted at 300° C., passed through a gear pump and a filter (pore size of 20 μm), and extruded from a die.

The molten resin was extruded from the die under the conditions of pressure fluctuation of 1% and temperature distribution of the molten resin of 2%. Specifically, the back pressure was regulated to be 1% higher than the average internal pressure of a barrel of the extruder, and the piping temperature of the extruder was regulated to be 2% higher than the average internal temperature of a barrel of the extruder to heat the resin.

The molten resin was extruded from the die onto a cast drum for cooling and caused to adhere to the cast drum for cooling set to 25° C. by using a static electricity applying method. By using a separation roll that was disposed to face the cast drum for cooling, the film was separated from the cast drum for cooling. Thus non-stretch polyester film 1 was obtained.

—Preparation of Easy-adhesion Layer on the side of the Polarizer—

According to the below procedures (1) to (5), coating solution for easy-adhesion layer on the side of the polarizer P1 was prepared.

(1) Synthesis of Polyester Copolymer Resin (A-1)

| | |
|---|---|
| Dimethyl terephthalate | 194.2 parts by mass |
| Dimethyl isophthalate | 184.5 parts by mass |
| Dimethyl-5-sodiumsulfoisophthalate | 14.8 parts by mass |
| Diethylene glycol | 233.5 parts by mass |
| Ethylene glycol | 136.6 parts by mass |
| Tetra-n-butyl titanate | 0.2 parts by mass |

Above compounds were mixed and transesterification was performed for 4 hours from 160° C. to 220° C. Sequentially, the mixture was heated to 225° C. and after the pressure of the reaction system was reduced gradually, the mixture was reacted under 30 Pa pressure for 1 hour and 30 minutes to provide polyester copolymer resin (A-1).

(2) Preparation of Polyester Water Dispersion (Aw-1)

| | |
|---|---|
| Polyester copolymer resin (A-1) | 30 parts by mass |
| Ethylene glycol n-butyl ether | 15 parts by mass |

Above compounds were placed and heated at 110° C. with stirring to resolve the resin. After the resin was completely dissolved, 55 parts by mass of water was added gradually to the polyester solution with stirring. After the addition, the solution was cooled to the room temperature with stirring to prepare milky white color polyester water dispersion (Aw-1) having 30% by mass solid concentration.

(3) Preparation of Polyvinyl Alcohol Aqueous Solution (Bw-1)

90 parts by mass of water was placed and polyvinyl alcohol resin (B-1) (made by KURARAY CO., LTD.) having 88% degree of polymerization saponification and 500 degree of polymerization was added gradually with stirring. After adding, the solution was heated to 95° C. with stirring to resolve the resin. After the resin was dissolved, the solution was cooled to the room temperature with stirring to prepare polyvinyl alcohol aqueous solution (Bw-1) having 10% by mass solid concentration.

(4) Preparation of Block Polyisocyanate Water Dispersion (C-1)

| | |
|---|---|
| Polyisocyanate compound having isocyanurate structure from hexamethylene diisocyanate (DURANATE TPA, manufactured by Asahi Kasei Chemicals Corporation) | 100 parts by mass |
| Propyleneglycol monomethylether acetate | 55 parts by mass |
| Proethyleneglycol monomethylether (average molecular weight 750) | 30 parts by mass |

Above compounds were mixed and preserved under nitrogen atmosphere for 4 hours at 70° C. Then, the temperature of the reaction solution was lowered to 50° C. and 47 parts by mass of methyl ethyl ketoxime was dropped. Infrared spectrum of the reaction solution was measured and confirmed that the absorption band of isocyanate group was disappeared to provide block polyisocyanate water dispersion (C-1) having 75% by mass solid concentration.

Coating materials below were mixed to prepare a coating solution for easy-adhesion layer on the side of the polarizer P1 having mass ratio which polyester resin (A-1)/polyvinyl alcohol resin (B-1) is 70/30.

(5) Preparation of a Coating Solution for Easy-Adhesion Layer on the Side of the Polarizer P1

| | |
|---|---|
| Water | 40.61% by mass |
| Isopropanol | 30.00% by mass |
| Polyester water dispersion (Aw-1) | 11.67% by mass |
| Polyvinyl alcohol aqueous solution (Bw-1) | 15.00% by mass |
| Crosslinking agent of block polyisocyanate dispersion (C-1) | 0.67% by mass |
| Particles (average particle diameter 100 nm, silica sol, 40% by mass solid concentration) | 1.25% by mass |
| Catalyst (organotin based compound,14% by mass solid concentration) | 0.3% by mass |
| Surfactant (silicone based, 10% by mass solid concentration) | 0.5% by mass |

—Coating Easy-Adhesion Layer on One Side of the Non-stretch Polyester Film—

The above-prepared coating solution for an easy-adhesion layer on the side of the polarizer P1 was applied to one side of the non-stretch polyester film 1 by reverse-roll coating so that the amount of dried coating was 0.12 g/m$^2$.

—Width Direction Stretching Step—

——Preheating Section——

Preheating temperature at preheating section was set to 90° C. and the non-stretch polyester film 1, on which the easy-adhesion layer had been formed, was heated to the temperature to be stretchable.

——Stretching Section——

The non-stretch polyester film 1, on which the easy-adhesion layer had been formed and preheated, was guided to a tenter (width direction stretching machine). While holding the edges of the film with clips, the film was stretched in the TD (Transverse Direction, width direction of film) according to the methods and the condition set forth below. Thus, a width direction stretching polyester film 1 was obtained.

<<Condition>>

Temperature of width direction stretching: 90° C.
Width direction stretching ratio: 4.3 times ——Thermal Fixation Section——

Subsequently, a thermal fixation was performed with controlling the surface temperature of the width direction stretching polyester film 1 to the temperature set forth below.

<<Condition>>

Temperature of thermal fixation: 180° C.
Time of thermal fixation: 15 seconds

——Thermal Relaxation Section——

The width direction stretching polyester film 1 after the thermal fixation was heated to the temperature set forth below and the film was relaxed.

Temperature of thermal relaxation: 170° C.
Thermal relaxation ratio: TD (film width direction), 2%

——Cooling Section——

Next, the width direction stretching polyester film 1 after the thermal relaxation was cooled at a cooling temperature of 50° C.

Thus prepared width direction stretching polyester film 1 after thermal relaxation which the easy-adhesion layer on the side of the polarizer was coated is used as the protective film disposed on the surface far from the liquid crystal cell of the polarizer, that is the first protective film, in the viewing-side polarizing plate of Example 1 mentioned later.

The moisture permeability of the prepared first protective film was measured according to JIS Z-0208 under the condition 40° C., relative humidity 90%.

Refractive indexes nx, ny and nz of the prepared first protective film was measured using "Abbe Refractometer NAR-4T" manufactured by Atago Inc. and sodium vapor lamp at the wavelength of 589 nm to determine Re and Rth from the method described in this specification. The in-plane direction retardation at the wavelength of 589 nm of the first protective film Re(589) was 10260 nm. The thickness direction retardation at the wavelength of 589 nm of the first protective film Rth(589) was 10493 nm. These results were shown in Table 1 below.

(First Protective Films Used For Examples 2 to 5, 8 and Comparative Examples 3, 5 and 6)

First protective films used for Examples 2 to 5, 8 and Comparative Examples 3, 5 and 6 were prepared in the same way as in Example 1, except that the thickness of the film was changed to the thickness shown in Table 1 below.

The moisture permeability, the in-plane direction retardation at the wavelength of 589 nm Re(589), and the thickness direction retardation at the wavelength of 589 nm Rth(589) of each first protective film were measured in the same way as in Example 1. The result was shown in Table 1 below.

(First Protective Films Used For Example 6)

First protective film used for example 6 was prepared in the same way as in Example 1, except that the film was contracted 0.7 times in the vertical direction simultaneously when the film was stretched 4.3 times in the transverse direction and the thickness of the film was changed to 50 μm.

The moisture permeability, the in-plane direction retardation at the wavelength of 589 nm Re(589), and the thickness direction retardation at the wavelength of 589 nm Rth(589) of the manufactured first protective film were measured in the same way as in Example 1. The result was shown in Table 1 below.

(First Protective Films Used For Examples 7 and 9)

First protective film used for Examples 7 and 9 were prepared in the same way as in Example 1, except that the resin was changed to polyethylene-2,6-naphthalate (poly(ethylene naphthalate):PEN) and the thickness of the film was changed to the thickness shown in the Table 1 below.

The moisture permeability, the in-plane direction retardation at the wavelength of 589 nm Re(589), and the thickness direction retardation at the wavelength of 589 nm Rth(589) of the manufactured first protective films were measured in the same way as in Example 1. The result was shown in Table 1 below.

(First Protective Films Used For Comparative Examples 1, 2 and 4)

A triacetyl cellulose (Tri-Acetyl-Cellulose; TAC) film "TD80" made by Fujifilm Corporation was used as the first protective film and it was used for Comparative Examples 1, 2 and 4.

The moisture permeability was measured in the same way as in Example 1. The in-plane direction retardation at the wavelength of 589 nm Re(589) and the thickness direction retardation at the wavelength of 589 nm Rth(589) of the manufactured first protective films were measured using an automatic double refractometer "KOBRA-21ADH" manufactured by Oji Scientific Instruments. The result was shown in Table 1 below.

<Preparation of Polarizing Plate>

Via a polyvinyl alcohol based adhesive agent, each first protective film used for Examples 1 to 9 and Comparative Examples 1 to 6 obtained by the above mentioned method was laminated on one surface of a polarizing plate which was manufactured by uniaxial stretching the polyvinyl alcohol based film and died with iodine. Further, a phase difference film for VA mode "V-TAC" made by Fujifilm Corporation as the second protective film was laminated on another surface of a polarizing plate to manufacture each polarizing plate used for viewing-side polarizing plate in the liquid crystal display devices of Examples 1 to 9 and Comparative Examples 1 to 6.

Examples 1 to 9 and Comparative Examples 1 to 6

<Manufacture of Liquid Crystal Display Device>

From a liquid crystal TV manufactured by SONY Corporation "KDL-46W900A", "KDL-52ZX5", "KDL-40ZX1", or "KDL-40F1", a viewing-side of a liquid crystal cell (front side) polarizing plate was removed. Instead of polarizing plate removed, the Each polarizing plate for used for Examples 1 to 9 and Comparative Examples 1 to 6 was laminated on the liquid crystal cell using adhesive film "SK2057" manufactured by Soken Chemical & Engineering Co., Ltd. so that each first protective film disposed on the surface far from the liquid crystal cell of the polarizer. The liquid crystal display devices of Examples 1 to 9 and Comparative Examples 1 to 6 were prepared.

[Evaluation]

<Color Reproducibility (National Television System Committee (NTXC) Ratio)>

Only red-colored pixel, only green-colored pixel and only blue-colored pixel of the manufactured liquid crystal display device of Examples and Comparative Examples were lighted in a sequentially order and the chromaticity was measured by the color luminance meter (TOPCON TECHNOHOUSE CORPORATION, BM-5A). National Television System Committee ratio (%) was calculated by dividing the triangular area comprised by connecting the measured chromaticity point of red, green and blue on the (x, y) chromaticity diagram by the triangular area comprised by connecting the chromaticity point of three primary colors of National Television System Committee standard. In practical use, National Television System Committee ratio (%) is preferably 90% or more, more preferably 100% or more.

Obtained results were shown on Table 1 below.

<Display Nonuniformity after Moisture-Heat Aging>

The liquid crystal display devices of Examples and Comparative Examples were preserved for 72 hours at 50° C. relative humidity of 60%. Then the liquid crystal display devices were placed for 5 hours at 25° C. relative humidity of 60% with the backlight thereof lighting, and the light leakage at the four corners of the liquid crystal panel when they displayed the full-screen black display screen were evaluated.

The light leakage at the four corners was evaluated based on the brightness difference between the average brightness of the entire screen and the brightness at the points at the four corners where the light leakage is high by shooting the black display screen from the screen front using luminance measurement camera "ProMetric" (Radiant Imaging Inc.). The light leakage at the four corners was evaluated according to the evaluation index below. Rank A or B is necessary for practical use, and rank A is preferable.

(Evaluation Index)

A: display nonuniformity (light leakage) at the four corners of the panel is not visually recognized (display nonuniformity (light leakage) at the four corners of the panel is the same level as fresh condition).

B: slight display nonuniformity (light leakage) at any one corner of the panel is recognized, but permissible.

C: strong display nonuniformity (light leakage) at any one corner of the panel is recognized and not permissible.

Obtained results were shown on Table 1 below.

<Rainbow-like Unevenness>

The liquid crystal display devices of Examples and Comparative Examples were observed from front and oblique direction. The rainbow-like unevenness was evaluated according to the evaluation index below. Rank A or B is necessary for practical use, and rank A is preferable.

(Evaluation Index)

A: rainbow-like unevenness is not visually recognized at any azimuthal angle and polar angle.

B: there is a case where very weak rainbow-like unevenness is visually recognized.

C: strong rainbow-like unevenness is visually recognized.

Obtained results were shown on Table 1 below.

TABLE 1

| | Light source unit | | | | | | | |
|---|---|---|---|---|---|---|---|---|
| | full width at half maximum of green emission peak | full width at half maximum of red emission peak | wavelength of L1 | wavelength of L2 unit | wavelength of L3 | L1/L2 | L3/L2 | Kinds of light source |
| | nm | nm | nm | nm | nm | % | % | — |
| Ex. 1 | 37 | 31 | 491 | 531 | 580 | 11 | 4 | Quantum dot |
| Ex. 2 | 20 | 40 | 497 | 530 | 568 | 0 | 0 | Quantum dot |
| Ex. 3 | 40 | 40 | 485 | 530 | 583 | 3 | 3 | Quantum dot |
| Ex. 4 | 60 | 60 | 481 | 530 | 581 | 15 | 31 | Quantum dot |
| Ex. 5 | 20 | 20 | 497 | 530 | 584 | 0 | 0 | Quantum dot |
| Ex. 6 | 20 | 20 | 497 | 530 | 584 | 0 | 0 | Quantum dot |
| Ex. 7 | 20 | 20 | 497 | 530 | 584 | 0 | 0 | Quantum dot |
| Ex. 8 | 38 | 20 | 490 | 523 | 587 | 17 | 4 | three color LED |
| Ex. 9 | 37 | 31 | 491 | 531 | 580 | 11 | 4 | Quantum dot |
| Comp. Ex. 1 | 37 | 31 | 491 | 531 | 580 | 11 | 4 | Quantum dot |
| Comp. Ex. 2 | 120 | 102 | 480 | 548 | Nothing | 61 | — | White color LED |
| Comp. Ex. 3 | 120 | 102 | 480 | 548 | Nothing | 61 | — | White color LED |
| Comp. Ex. 4 | 90 | 91 | 486 | 525 | 588 | 50 | 51 | White color LED |
| Comp. Ex. 5 | 2 | 2 | 490 | 546 | 571 | 5 | 1 | CCFL |
| Comp. Ex. 6 | 37 | 31 | 491 | 531 | 580 | 11 | 4 | Quantum dot |

TABLE 1-continued

|  | first protective film | | | | | Evaluation | | |
|---|---|---|---|---|---|---|---|---|
|  | | | | | | Color reproducibility (NTSC ratio) | display nonuniformity after moisture-heat aging | rainbow-like unevenness |
|  | Resin | Film thickness | moisture permeability | Re(589) | Rth(589) | Re(589)/Rth(589) | | |
|  | — | μm | g/m²/day | nm | nm | unit — | % | — | — |
| Ex. 1 | PET | 100 | 9 | 10260 | 10493 | 1.0 | 106 | A | A |
| Ex. 2 | PET | 100 | 9 | 10260 | 10493 | 1.0 | 114 | A | A |
| Ex. 3 | PET | 80 | 10 | 8172 | 8358 | 1.0 | 105 | A | A |
| Ex. 4 | PET | 100 | 9 | 10260 | 10493 | 1.0 | 90 | A | A |
| Ex. 5 | PET | 100 | 9 | 10260 | 10493 | 1.0 | 120 | A | B |
| Ex. 6 | PET | 50 | 15 | 6414 | 4426 | 1.4 | 120 | A | A |
| Ex. 7 | PEN | 90 | 4 | 19156 | 22455 | 0.9 | 120 | A | A |
| Ex. 8 | PET | 100 | 9 | 10260 | 10493 | 1.0 | 107 | B | B |
| Ex. 9 | PEN | 40 | 8 | 8514 | 9980 | 0.9 | 106 | A | A |
| Comp. Ex. 1 | TAC | 80 | 437 | 3 | 42 | 0.1 | 106 | C | A |
| Comp. Ex. 2 | TAC | 80 | 437 | 3 | 42 | 0.1 | 76 | C | A |
| Comp. Ex. 3 | PET | 80 | 10 | 8172 | 8358 | 1.0 | 76 | B | A |
| Comp. Ex. 4 | TAC | 80 | 437 | 3 | 42 | 0.1 | 84 | C | A |
| Comp. Ex. 5 | PET | 80 | 10 | 8172 | 8358 | 1.0 | 96 | B | C |
| Comp. Ex. 6 | PET | 40 | 23 | 4104 | 4197 | 1.0 | 106 | A | C |

As shown in the above table 1, it has been confirmed that the liquid crystal display device of the present invention exhibits a high color reproducibility, is prevented from occurring a display nonuniformity where it has been preserved under a high temperature and high humidity environment and then is lighted, and is prevented from occurring a rainbow-like unevenness.

In particular, the liquid crystal display device of the present invention exhibits 90% or more National Television System Committee ratio and it has been confirmed that it is possible to realize a high or wide color reproduction.

On the other hand, the liquid crystal display devices of Comparative Examples 2 and 3 exhibit low National Television System Committee ratio and low color reproducibility because they used a light source unit having broad emitting spectrum and not having a local minimum in the wavelength range of 560 to 620 nm. Further, the liquid crystal display device of Comparative Examples 4 exhibits low National Television System Committee ratio and low color reproducibility because it used a light source unit having local minimums in the wavelength range of 460 to 520 nm and in the wavelength range of and 560 to 620 nm but the local minimums being larger than the ratio restricted in the present invention and therefore blue, green and red light are not sufficiently separated.

Moreover, the liquid crystal display devices of the present invention were prevented from occurring from bending at the four corners of the panel where it had been preserved under a high temperature and high humidity environment and then was lighted and also prevented from occurring a display nonuniformity at the four corners of the panel.

On the other hand, the liquid crystal display devices of Comparative Examples 1, 2 and 4 occurred bending at the four corners of the panel where it had been preserved under a high temperature and high humidity environment and then was lighted and occurred a display nonuniformity at the four corners of the panel because they used a film having high moisture permeability as the first protective film.

In addition, the liquid crystal display devices of Example 8 and Comparative Examples 3 and 5 exhibit, there is no problem in practice use but slight display nonuniformity (light leakage) at any corner of the panel is recognized compared with Example 3 using PET film having almost same moisture permeability as the first protective film because they used white color LED or CCFL which heat emission was high as a light source unit. The liquid crystal display devices of Comparative Examples 6 had little problem of occurring a display nonuniformity at the four corners of the panel where it had been preserved under a high temperature and high humidity environment and then was lighted.

The liquid crystal display devices of the present invention exhibited good display performance and rainbow-like unevenness which cause problem in practical use was not visually recognized where they were observed both in front and in oblique direction.

On the other hand, in Comparative Example 5, rainbow-like unevenness was not prevent from occurring even if a PET film having high Re was used as the first protect film because CCFL having small full width at half maximum of the green color emission intensity peak and the red color emission intensity peak was used as a light source unit. Further, the liquid crystal display devices of Comparative Example 6 exhibited particularly bad display performance and strong rainbow-like unevenness was visually recognized because the retardation Re(589) of the film which was used as the first protective film was less than 5,000 nm.

According to the present invention, a liquid crystal display device exhibiting a high color reproducibility, prevented from occurring a display nonuniformity where it has been preserved under a high temperature and high humidity environment and then is lighted, and prevented from occurring a rainbow-like unevenness can be provided. Therefore, the liquid crystal display device of the present invention can be used for all kinds of liquid crystal display devices which require high display quality and durability, including a TV, a monitor, a digital signage, a smart phone, a car navigation system, a digital camera, an electronic game machine. Therefore, industrial applicability of the present invention is high.

The present disclosure relates to the subject matter contained in Japanese Patent Application No. 2014-99880 filed on May 13, 2014, which are expressly incorporated herein by reference in their entirety. All the publications referred to in the present specification are also expressly incorporated herein by reference in their entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

What is claimed is:

1. A liquid crystal display device comprising:
   at least a light source unit emitting light comprising a blue light emission intensity peak in the wavelength range of 400 to 500 nm, a green light emission intensity peak in the wavelength range of 500 to 600 nm and a red light emission intensity peak in the wavelength range of 600 to 680 nm,
   a light source unit-side polarizing plate,
   a liquid crystal cell and
   a viewing-side polarizing plate in this order,
   wherein the full widths at half maximum of the green color emission intensity peak and the red color emission intensity peak are 20 nm or more,
   wherein the light emitted by the light source unit has a local minimum L1 in the wavelength range of 460 to 520 nm, a local maximum L2 in the wavelength range of 520 to 560 nm and a local minimum L3 in the wavelength range of 560 to 620 nm,
   wherein the local minimum L1 and the local minimum L3 are less than 35% of the local maximum L2,
   wherein at least one of the light source unit-side polarizing plate and the viewing-side polarizing plate has a polarizer and a first protective film disposed on the surface far from the liquid crystal cell of the polarizer,
   wherein an in-plane direction retardation at the wavelength of 589 nm Re(589) of the first protective film is 5,000 nm or more,
   wherein the moisture permeability of the first protective film at the temperature of 40° C. and the relative humidity of 90% is 100 g/m²/day or less, and
   wherein a ratio of the in-plane direction retardation at the wavelength of 589 nm Re(589) and a thickness direction retardation at the wavelength of 589 nm Rth(589) Re(589)/Rth(589) in the first protective film is 0.8 to 2.0.

2. The liquid crystal display device according to claim 1, wherein the light source unit comprises
   a blue color light emitting diode or an ultraviolet light emitting diode, and
   a fluorescent substance,
   wherein the fluorescent substance is able to emit light by being excited by light from the blue color light emitting diode or an ultraviolet light emitting diode.

3. The liquid crystal display device according to claim 2, wherein the fluorescent substance comprises at least one quantum dot.

4. The liquid crystal display device according to claim 1, wherein the first protective film is stretched at least in uniaxial direction.

5. The liquid crystal display device according to claim 1, wherein the first protective film is a polyethylene terephthalate film or a polyethylene-2,6-naphthalate film.

6. The liquid crystal display device according to claim 1, wherein the first protective film is a polyethylene terephthalate film.

7. The liquid crystal display device according to claim 1, wherein the thickness of the first protective film is 10 to 500 μm.

8. The liquid crystal display device according to claim 1, wherein the local minimum L1 and the local minimum L3 are less than 20% of the local maximum L2.

9. The liquid crystal display device according to claim 1, wherein the local minimum L1 is both local minimum and minimum L1' in the wavelength range of 460 to 520 nm,
   wherein the local maximum L2 is both local maximum and maximum L2' in the wavelength range of 520 to 560 nm,
   wherein the local minimum L3 is both local minimum and minimum L3' in the wavelength range of 560 to 620 nm.

10. The liquid crystal display device according to claim 1, wherein the viewing-side polarizing plate comprises the first protective film.

* * * * *